United States Patent [19]

Yoshizaki et al.

[11] Patent Number: 5,654,104
[45] Date of Patent: Aug. 5, 1997

[54] STEEL PRODUCT COVERED WITH HIGH-STRENGTH POLYOLEFIN

[75] Inventors: Nobuki Yoshizaki; Yoshihiro Miyajima; Yoshihisa Kariyazono; Hirotaka Sato; Toshiyuki Sasaki; Hiroyuki Mimura, all of Kimitsu, Japan

[73] Assignee: Nippon Steel Corporation, Tokyo, Japan

[21] Appl. No.: 387,903

[22] PCT Filed: Jun. 24, 1994

[86] PCT No.: PCT/JP94/01023

§ 371 Date: Mar. 30, 1995

§ 102(e) Date: Mar. 30, 1995

[87] PCT Pub. No.: WO95/00328

PCT Pub. Date: Jan. 5, 1995

[30] Foreign Application Priority Data

Jun. 14, 1994 [JP] Japan ................... 6-154310
Jun. 24, 1994 [JP] Japan ................... 5-175926

[51] Int. Cl.$^6$ ................... B32B 15/08; B32B 15/18; B29C 47/00
[52] U.S. Cl. ................... 428/461; 428/332; 428/334; 428/336; 156/244.23
[58] Field of Search ................... 428/461, 515, 428/332, 334, 336

[56] References Cited

U.S. PATENT DOCUMENTS

| | | | |
|---|---|---|---|
| 4,378,395 | 3/1983 | Asohina et al. | 428/413 |
| 4,980,210 | 12/1990 | Heyes | 428/461 |
| 5,100,708 | 3/1992 | Heyes et al. | 428/461 |
| 5,516,397 | 5/1996 | Takano et al. | 428/332 |

FOREIGN PATENT DOCUMENTS

| | | |
|---|---|---|
| A-0284939 | 10/1988 | European Pat. Off. . |
| 63-272482 | 2/1988 | Japan . |
| 63-251692 | 10/1988 | Japan . |
| 4-355128 | 12/1992 | Japan . |

Primary Examiner—Tae Yoon
Attorney, Agent, or Firm—Kenyon & Kenyon

[57] ABSTRACT

The present invention relates to a polyolefin-covered steel product and more particularly to a polyolefin-covered steel product, for use in a steel structure, having excellent impact resistance, flaw resistance and resistance to abrasion by littoral drift.

The polyolefin-covered steel product comprises a steel product which has been subjected to surface treatment, and having laminated onto the treated surface, a modified polyolefin resin layer and a polyolefin resin layer, characterized in that the surface of the polyolefin resin layer is further covered with a fiber cloth to which a modified polyolefin resin has been laminated.

12 Claims, 2 Drawing Sheets

STEEL PRODUCT COVERED WITH HIGH-STRENGTH POLYOLEFIN

TECHNICAL FIELD

The present invention relates to a polyolefin-covered steel product and particularly to a polyolefin-covered steel product, for use in steel structures, having excellent impact resistance, flaw resistance, and resistance to abrasion by littoral drift or the like.

PRIOR ART

Polyolefin-covered steel products, such as polyolefin-covered metal pipes and polyolefin-covered steel sheet piles, have become used widely as steel pipes for piping, heavy-duty anticorrosive steel pipe piles in the sea, and heavy-duty anticorrosive steel sheet piles, by virtue of excellent anticorrosive properties.

The polyolefin-covered steel products, however, are likely to suffer dents at the time of handling, such as execution of piping on the spot, flaws on the surface of the covering caused by soil, pebbles, and the like at the time of mounting by driving for polyolefin-covered steel pipe piles and polyolefin steel sheet piles, and flaws in the covering at the time of execution of works of ripraps. Thus there is a requirement for the covering layer to have further improved mechanical strength and further improved surface hardness. In order to solve these problems, for example, Japanese Unexamined Patent Publication (Kokai) No. 63-27248 proposes a polyolefin-covered steel product or the like comprising a steel product which has been subjected to surface treatment, a modified polyolefin resin layer and a polyolefin resin layer laminated on the treated surface, and, laminated thereon, a fiber reinforced modified polyolefin resin layer comprising a glass fiber or the like dispersed in a silane modified polyolefin resin, for the purpose of improving the impact resistance and the flaw resistance of the polyolefin-covered steel product. Even the above covered steel product having improved impact resistance and flaw resistance has a drawback that the covering, when exposed in a coastal region which is a sandy place rich in littoral drift, is remarkably abraded, remarkably deteriorating the durability of steel structures. Specifically, an enhancement in surface hardness and strength of the material to a relatively high value as in the case of the conventional covered steel products is effective in preventing flaws by the action of large instantaneous energy, such as flaws caused by collision and dents. However, the conventional covered steel products have a drawback that, when they are exposed to littoral drift or the like, which abrades the surface of the covered steel product over a long period of time, although the instantaneous collision energy thereof is small, the covered steel products are gradually abraded because the covering per se is hard and fragile. Therefore, in the prior art, it was difficult to provide a polyolefin-covered steel product excellent in resistance to flaws caused by collision or dents, as well as in resistance to abrasion by littoral drift and the like.

DISCLOSURE OF THE INVENTION

An object of the present invention is to provide a polyolefin-covered steel product, for use in steel structures, having excellent impact resistance, flaw resistance, resistance to abrasion with littoral drift, and the like.

The present inventors have made extensive and intensive studies with a view to solving the above problems of the prior art and, as a result, have found that, in a polyolefin-covered steel product for use in a steel structure, comprising a steel product which has been subjected to surface treatment and, laminated onto the treated surface, a modified polyolefin resin layer and a polyolefin resin layer, the covering of the surface of the polyolefin resin layer with a fiber cloth to which a modified polyolefin resin has been laminated, can offer an advantage in that, for the impact resistance, the fiber cloth provided on the polyolefin covering can prevent the occurrence of through flaws, the fiber cloth having a higher hardness than the polyolefin resin layer as an anticorrosive layer can prevent the occurrence of flaws during handling or the like at the time of execution of works and, further, the fiber cloth, which is hard but not fragile, has excellent resistance also to abrasion with littoral drift over a long period of time. That is, they have found that the above technique can provide a polyolefin-covered steel product excellent in impact resistance, flaw resistance, and resistance to abrasion by littoral drift or the like, which has led to the completion of the present invention.

Figure 1:
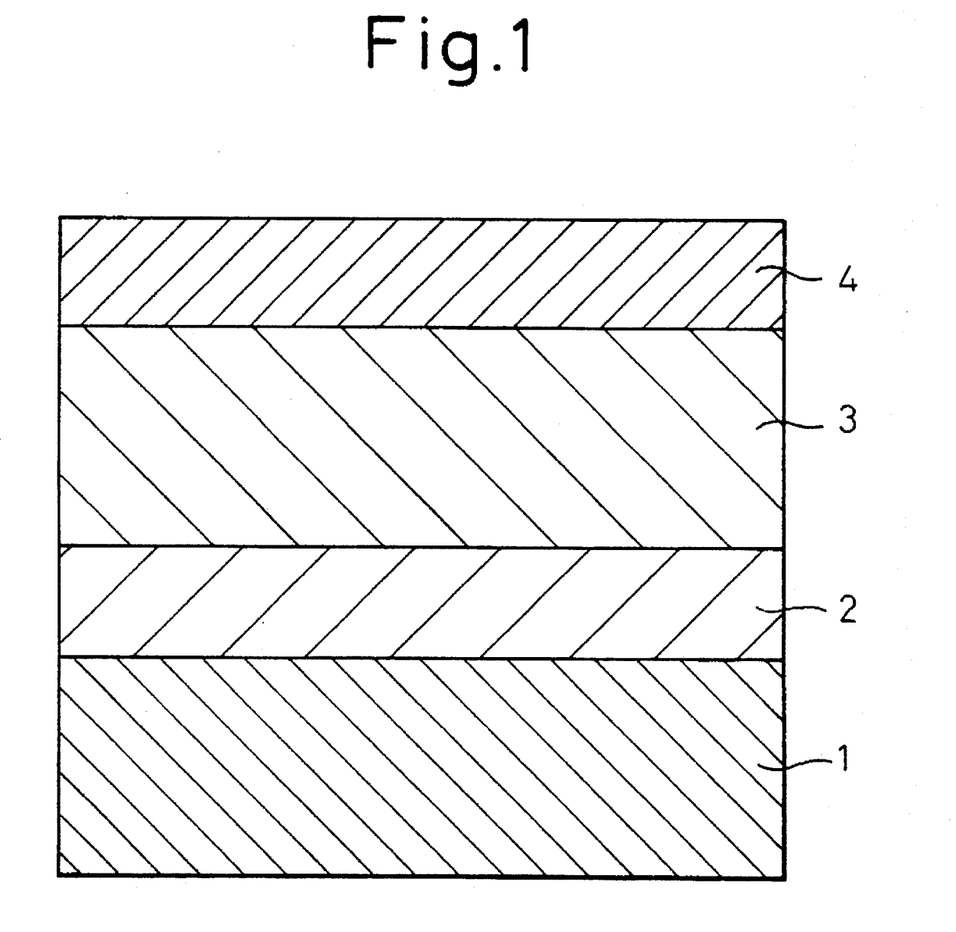
FIG. 1 is a partially vertical sectional view of the high-strength polyolefin-covered steel product according to the present invention.

Specifically, the present invention, as shown in FIG. 1, relates to a polyolefin-covered steel product having excellent impact resistance, flaw resistance, and resistance to abrasion by littoral drift or the like, comprising a steel product 1, which has been subjected to surface treatment as a pretreatment, and laminated onto the treated surface, a modified polyolefin resin layer 2 and a polyolefin resin layer 3, characterized in that the surface of the polyolefin resin layer 3 is covered with a fiber cloth 4 to which a modified polyolefin resin has been laminated. The subject matter of the present invention is as follows.

(1) A polyolefin-covered steel product having excellent impact resistance, flaw resistance, and abrasion resistance, for use in a steel structure, comprising a steel product which has been subjected to surface treatment as a pretreatment and, laminated onto the treated surface, a modified polyolefin resin layer and a polyolefin resin layer, characterized in that the surface of the laminate of said modified polyolefin resin layer and said polyolefin resin layer is covered with a fiber cloth to which a modified polyolefin resin has been laminated.

(2) A polyolefin-covered steel product having excellent impact resistance, flaw resistance, and abrasion resistance, for use in a steel structure, comprising a steel product, which has been subjected to surface treatment as a pretreatment, and having laminated onto the treated surface, a modified polyolefin resin layer and a polyolefin resin layer, characterized in that the surface of the laminate of said modified polyolefin resin layer and said polyolefin resin layer is covered with a fiber cloth to which a modified polyolefin resin, containing a color pigment comprising an organic pigment or an inorganic pigment and various antioxidants, has been laminated.

(3) A polyolefin-covered steel product having excellent impact resistance, flaw resistance, and abrasion resistance, for use in a steel structure, comprising a steel product, which has been subjected to surface treatment as a pretreatment, and having laminated onto the treated surface, a modified polyolefin resin layer and a polyolefin resin layer, characterized in that the surface of the laminate of said modified polyolefin resin layer and said polyolefin resin layer is covered with a colored fiber cloth to which a modified polyolefin resin has been laminated.

(4) The polyolefin-covered steel product having excellent impact resistance, flaw resistance, and abrasion resistance according to any one of the above items (1) to (3), wherein said surface treatment comprises a chromate treatment to produce a chromate coating at a total Cr coverage of 10 to 1500 mg/m$^2$.

(5) The polyolefin-covered steel product having excellent impact resistance, flaw resistance, and abrasion resistance according to any one of the above items (1) to (3), wherein said surface treatment comprises a chromate treatment to produce a chromate coating at a total Cr coverage of 10 to 1500 mg/m$^2$ and an epoxy primer treatment to produce a primer coating having a thickness of 5 to 300 µm.

(6) The polyolefin-covered steel product having excellent impact resistance, flaw resistance, and abrasion resistance according to any one of the above items (1) to (3), wherein said modified polyolefin resin covering has a thickness in the range of from 10 µm to 3 mm, said polyolefin resin covering has a thickness in the range of from 1 to 10 mm, and said modified polyolefin resin covering laminated onto said fiber cloth has a thickness in the range of from 5 µm to 10 mm.

Best Mode for Carrying Out the Invention

FIG. 1 is a partially sectional view of a high-strength polyolefin-covered steel product according to the present invention having a construction according to the present invention. In the drawing, numeral 1 designates a steel product, from which oils, scales, and the like have been removed by pickling, blasting, or the like, or a steel product of the same type as described above except that it has been further subjected to conversion treatment, such as treatment with a chromate, an organic primer, a silane coupling agent, or the like, numeral 2 designates a modified polyolefin resin, numeral 3 designates a polyolefin resin, and numeral 4 designates a fiber cloth with a modified polyolefin resin laminated thereonto.

Steel products usable in the present invention include steel sheets and plates, such as cold-rolled steel sheets, hot-rolled steel sheets, and thick steel plates, shape steels, such as H sections, I sections, and L sections, steel sheet piles, bar steels, steel wires, cast iron pipes, steel pipes, and steel pipe piles. These steel sheet and plates, shape steels, steel sheet piles, bar steels, steel wires, steel pipes, and steel pipe piles may have a surface plated with zinc, nickel, chromium, aluminum, zinc-aluminum, zinc-nickel, zinc-nickel-cobalt, and the like.

In the present invention, the steel product which has been subjected to surface treatment is a steel product having a surface from which oils, scales, and the like have been removed by degreasing, pickling, sand blasting, grit blasting, shot blasting, or the like. Further, the surface of the steel product, from which oils, scales, and the like have been removed, may be subjected to conversion treatment involving one, or a combination of two or more, of the conventional treatment with a chromate, treatment with an organic primer, treatment with a silane coupling agent, and the like.

The coverage of the chromate treatment is preferably in the range of from 10 to 1500 mg/m$^2$ in terms of the coverage of total Cr. When the coverage of Cr is less than 10 mg/m$^2$, the adhesion between the covering material and the steel product is so low that, during an impact test, the covering is cracked and, at the same time, the covering material peels off. When the coverage of Cr is larger than 1500 mg/m$^2$, the chromate treatment agent layer becomes so fragile that, when an impact is propagated through the surface of the covering material, the chromate treatment layer is broken, remarkably lowering the impact resistance. The thickness of the organic primer layer is preferably in the range of from 5 to 300 µm. When the thickness of the primer layer is less than 5 µm, the adhesion between the covering material and the steel product is so low that, during an impact test, the covering is cracked and, at the same time, the covering material is peeled off. On the other hand, when the thickness of the primer layer exceeds 300 µm, the strain accompanying curing in the primer coating becomes so large that the primer coating is cracked during an impact test and, at the same time, peeled off. If the above surface treatment is not carried out, the adhesion between the steel product and the modified polyolefin resin layer becomes so low that peeling occurs at the interface of the steel product and the modified polyolefin resin layer when the covered steel product is exposed to an environment wherein the covered steel product comes in contact with water for a long period of time, unfavorably lowering the long-term corrosion resistance of the steel product.

The modified polyolefin resin and the polyolefin resin used in the present invention will now be described.

The modified polyolefin resin used in the present invention refers to a polyolefin modified with an unsaturated carboxylic acid, such as maleic acid, acrylic acid, or methacrylic acid, or an anhydrides thereof, the above modified polyolefin properly diluted with a polyolefin, and a silane-modified polyolefin, produced by modifying a polyolefin with an unsaturated silane compound, such as vinyltrimethoxysilane, vinyltriethoxysilane, vinylmethyldiethoxysilane, or vinylphenyldimethoxysilane, properly diluted with a polyolefin. The thickness of the modified polyolefin covering layer is in the range of from 10 µm to 3 mm, preferably in the range of from 50 to 300 µm. When the layer thickness is less than 10 µm, the adhesive force is insufficient for the polyolefin-covered steel product to maintain its corrosion resistance for a long period of time, causing cracking and peeling during an impact test. On the other hand, a layer thickness exceeding 3 mm is effective from the viewpoint of impact strength. However, it is unfavorable from the viewpoint of economy.

The polyolefin resin used in the present invention is a blend of a low-density polyethylene, a medium-density polyethylene, a high-density polyethylene, or a straight-chain low-density polyethylene having a density of 0.92 to 0.96 g/cm$^3$ with at least one of a polypropylene and an ethylene-propylene block or random copolymer having a density of 0.87 to 0.91 g/cm$^3$, and an ethylene-butene-1 block or random copolymer having a density of 0.89 to 0.94 g/cm$^3$ and the like. The covering layer thickness of the polyolefin resin is in the range of from 1 to 10 mm, preferably 2 to 4 mm. When the covering layer thickness of the polyolefin is less than 1.0 mm, cracking unfavorably occurs during an impact test. On the other hand, when the covering layer thickness of the polyolefin resin is larger than 10.0 mm, the impact strength increases with an increase in the covering layer thickness. This, however, is unfavorable from the viewpoint of economy.

The thickness of the polyolefin resin layer 3 may be determined by taking into consideration the external load, impact force, and economy in an actual environment.

Further, the polyolefin resin layer 3 may contain carbon black or may be made black to impart weather resistance enough to be used in the outdoors for a long period of time. Furthermore, when a colored polyolefin resin is used for reasons of harmonization with environment and the like, various organic pigments and inorganic pigments may be added alone or in the form of a mixture of two or more for coloring purposes. Furthermore, any antioxidant and the like may be added from the viewpoint of improving the weather resistance. The adoption of the above techniques does not change the subject matter of the present invention.

The fiber cloth 4, with a modified polyolefin resin being laminated thereto, used in the present invention is such a laminated fiber cloth as produced by providing any one of the above modified polyolefin resins, more specifically a modified polyolefin resin identical to the modified polyolefin resin used for adhering between a steel product and a polyolefin resin as an underlying layer covering the modified polyolefin resin-laminated fiber cloth 4, previously melting the modified polyolefin resin, extruding the melted modified polyolefin resin into a sheet, laminating the sheet to a fiber cloth, and strongly heat-sealing the laminate. In this case, in order to improve the impregnation of the fiber cloth with the modified polyolefin resin, the modified polyolefin resin to be laminated on the fiber cloth may be those which have a higher melt index than the modified polyolefin resin used for adhering the polyolefin resin to the steel product.

Further, in order to enhance the adhesion between the fiber cloth or the like and the modified polyolefin resin, the fiber cloth or the like may be previously coated with the conventional surface treatment. The thickness of the modified polyolefin resin in the laminate is in the range of from 5 μm to 10 mm. However, it is preferably about 3.0 mm from the viewpoint of economy because the modified polyolefin resin is expensive.

When the thickness of the modified polyolefin resin layer in the laminate is smaller than 5 μm, it is unfavorably difficult to stably extrude the modified polyolefin resin into a sheet. Further, when the thickness of the modified polyolefin resin layer is smaller than 5 μm, the fiber cloth cannot be sufficiently evenly laminated thereto. In this case, although the occurrence of cracking and peeling during an impact test can be prevented, the surface roughness is so large that the covering is likely to be damaged during a flaw resistance test.

Carbon black is generally added to the modified polyolefin resin layer to be impregnated into the fiber cloth to turn the modified polyolefin resin black, thereby imparting weather resistance sufficient to withstand the use of the covered steel product in the outdoors for a long period of time. If a colored modified polyolefin resin is used for reasons of harmonization with a scene and the like, various organic pigments and inorganic pigments may be added alone or in the form of a mixture of two or more in order to color the modified polyolefin resin. This does not change the subject matter of the present invention. Moreover, in order to further improve the weather resistance of the colored polyolefin resin, it is also possible to add any antioxidant and the like to the modified polyolefin resin.

The fiber cloth 4, to which the modified polyolefin resin is to be laminated, may be any fiber cloth independently of inorganic fiber cloths (including metallic fiber cloths) and organic fiber cloths, including glass fiber cloths, such as a glass mat manufactured by Nitto Boseki Co., Ltd. (MC450S-020SE), a glass cloth (WF300-10N manufactured by Nitto Boseki Co., Ltd.), and a glass roving (RS240PE-525 manufactured by Nitto Boseki Co., Ltd.), a metallic fiber cloth, a vinyl cloth, asbestos, a carbon fiber mat, or a nonwoven fabric made of a polyester, acryl, polypropylene, rayon, or the like. The above fiber cloth may previously have any color, which does not change the subject matter of the present invention.

In order to reduce through flaws caused by impact, that is, in order to further improve the impact strength, it is preferred for the size of the stitch of the fiber cloth to be smaller. However, the density of the stitch is preferably relatively low from the viewpoint of sufficiently fusing the upper and lower modified polyolefin resins, which sandwich the fiber cloth therebetween, to each other. Therefore, when a covered steel product having a very high impact strength is desired, it is possible to adopt a method wherein a fiber cloth having a very fine stitch is used and a conventional surface treatment or the like is previously coated onto the fiber cloth to further improve the adhesion between the fiber cloth and the upper and lower modified polyolefin resins. The smaller the fiber diameter of the fiber cloth, the better the appearance of the covering of the polyolefin-covered steel product obtained. Further, the thickness of the fiber cloth is preferably much smaller than the thickness of the modified polyolefin resin sheet to be laminated.

When an inorganic fiber cloth, particularly a metallic fiber cloth is sandwiched between modified polyolefin resins, a deterioration in the modified polyolefin resin by oxidation due to contact between the modified polyolefin resin and the metal is expected. Therefore, in this case, it is preferred to previously add, besides an antioxidant usually added to the modified polyolefin resin, other antioxidants in a necessary amount. Therefore, when the type of the fiber cloth with the modified polyolefin resin being laminated thereto is determined, the layer thickness of the modified polyolefin resin, the type of the fiber cloth, and the like can be determined by sufficiently taking into consideration the external load and impact force in environment, under which the polyolefin-covered steel product is used, profitability, and the like.

The process for producing the high-strength polyolefin-covered steel product according to the present invention will now be described by taking a high-strength polyolefin-covered steel pipe as an example.

Figure 2:
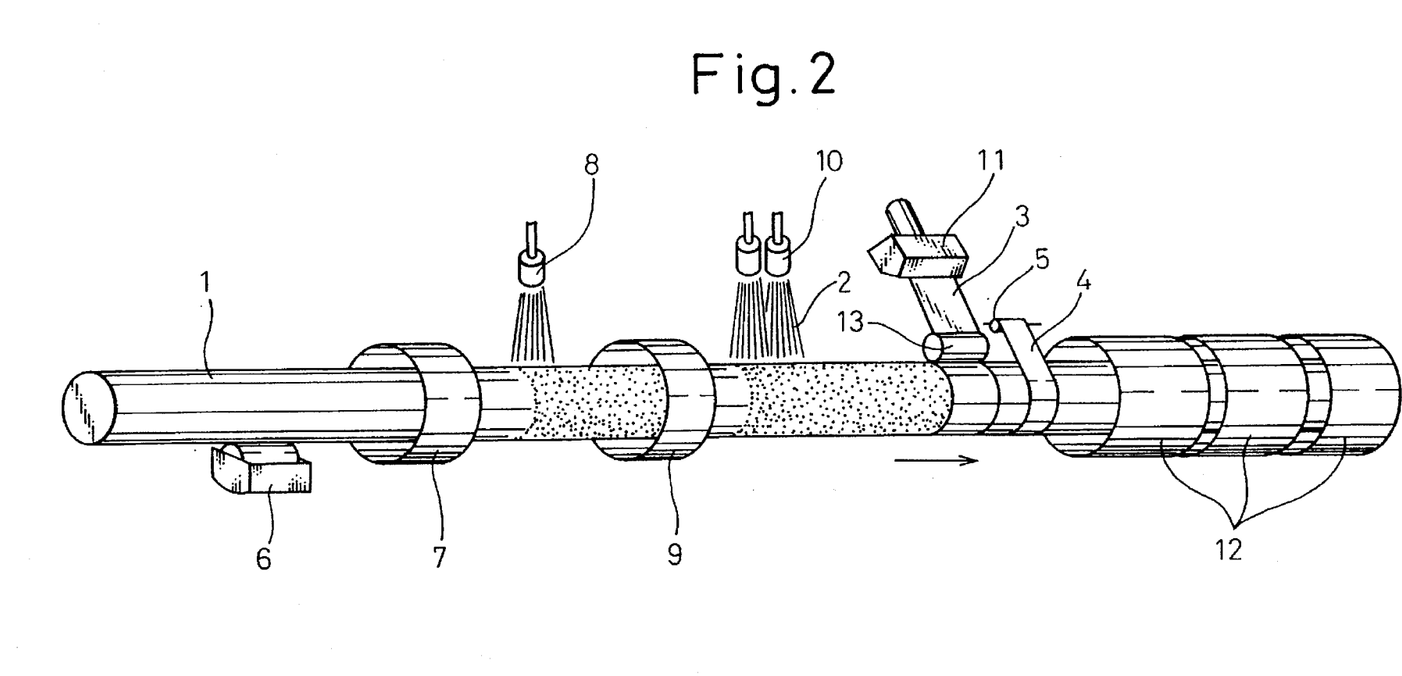
FIG. 2 is a schematic diagram showing an embodiment of a process for producing a high-strength polyolefin-covered steel pipe as an embodiment of the high-strength polyolefin-covered steel product according to the present invention.

The polyolefin-covered steel pipe can be produced, for example, by a production process shown in FIG. 2. Specifically, a chromate is coated on the surface of a steel pipe 1, from which scales and the like have been removed, by means of a chromate treatment coater 6, and the resultant coating is baked by means of a heater 7. An epoxy primer is then coated thereon by means of an epoxy primer coater 8, and the resultant coating is heat-cured by means of a post-heating device 9. Then, a modified polyolefin resin 2 is coated thereon by means of a modified polyolefin resin coater 10, and a polyolefin resin 3 is extrusion-coated thereon by means of a T die 11. Thereafter, the coated steel product is covered with a fiber cloth, to which a modified polyolefin resin has been laminated, by means of a device 5 for covering a fiber cloth with a modified polyolefin resin being laminated thereto, and sufficient pressure is applied to the resultant assembly by means of a pressure roll 13 so that the modified polyolefin resin and the polyolefin resin in the laminate can be strongly bonded to each other, followed by cooling with a cooler 12. Thus, the high-strength polyolefin-covered steel pipe according to the present invention is prepared. In FIG. 2, a method is used wherein a powder of a polyolefin resin is coated by electrostatic coating using a modified polyolefin resin coater 10. It is also possible to use conventional methods, such as a method wherein the modified polyolefin resin extrusion-coated by means of a T die or a ring die and a method wherein the modified polyolefin resin and the polyolefin resin are extrusion-coated in the form of two layers integral with each other by means of a T die.

The present invention will now be described in more detail with reference to the following examples, though it is not limited to these examples only.

EXAMPLES

Production examples of a steel pipe covered with a high-strength, low-density polyethylene according to the present invention will now be described.

A steel pipe (200A×5500 mm in length×5.8 mm in thickness) was grit-blasted, and a chromate treatment was blade-coated onto the surface thereof at a total Cr coverage of 500 mg/m². The resultant coating was heated at 190° C. for 3 min to carry out baking, an epoxy primer was coated by means of a spray coater to a thickness of 50 μm, and the resultant coating was then cured. Subsequently, a modified polyethylene resin was coated by electrostatic coating to a thickness of 200 μm, and a low-density polyethylene resin was extrusion-coated by means of a T-die to a thickness of 3.0 mm. Then, the resultant coating was covered with a fiber cloth (thickness: 2.0 mm), to which a modified polyolefin resin has been previously laminated, and the fiber cloth with the modified polyolefin resin layer as the uppermost layer being laminated thereonto was strongly bonded to the polyolefin resin layer as a corrosion-resistant layer. The assembly was then cooled to produce a high-strength, low-density polyethylene-covered steel pipe according to the present invention.

For Examples 1 to 7, the above steel pipes covered with a low-density polyethylene were produced with various types of fiber. For Examples 8 to 10, steel pipes covered with a high-strength polyolefin were produced in the same manner as described above, except that a high-density polyethylene, a straight-chain low-density polyethylene, and polypropylene were used instead of the low-density polyethylene resin.

TABLE 2

| | Covering material | | | |
|---|---|---|---|---|
| Ex. of Invention | Fiber cloth | Modified polyolefin resin | Layer thickness (mm) | Surface treatment of fiber cloth |
| 1 | Glass cloth | Maleic anhydride-modified PE* | 2.0 | Not done |
| 2 | Glass mat | Maleic anhydride-modified PE* | 2.0 | Not done |
| 3 | Glass roving | Maleic anhydride-modified PE* | 2.0 | Not done |
| 4 | Metallic fiber cloth | Maleic anhydride-modified PE* | 2.0 | Not done |
| 5 | Vinyl cloth | Maleic anhydride-modified PE* | 2.0 | Not done |
| 6 | Asbestos | Maleic anhydride-modified PE* | 2.0 | Not done |
| 7 | Polyester bonded fabric | Maleic anhydride-modified PE* | 2.0 | Not done |
| 8 | Glass cloth | Maleic anhydride-modified PE* | 2.0 | Not done |
| 9 | Glass cloth | Maleic anhydride-modified PE* | 2.0 | Not done |
| 10 | Glass cloth | Maleic anhydride-modified PP** | 2.0 | Not done |

Note)
Maleic anhydride PE marked with * is the abbreviation for polyethylene modified with maleic anhydride.
Maleic anhydride PP marked with ** is the abbreviation for polypropylene modified with maleic anhydride.

TABLE 1

| | Covering material | | | | | | | |
|---|---|---|---|---|---|---|---|---|
| Ex. of Invention | Chromate treatment | Layer thickness (mg/m²) | Epoxy primer | Layer thickness (μm) | Modified polyolefin resin | Layer thickness (μm) | Polyolefin resin | Layer thickness (mm) |
| 1 | Coated | 500 | Coated | 50 | Coated | 200 | Low-density polyethylene | 3.0 |
| 2 | Coated | 500 | Coated | 50 | Coated | 200 | Low-density polyethylene | 3.0 |
| 3 | Coated | 500 | Coated | 50 | Coated | 200 | Low-density polyethylene | 3.0 |
| 4 | Coated | 500 | Coated | 50 | Coated | 200 | Low-density polyethylene | 3.0 |
| 5 | Coated | 500 | Coated | 50 | Coated | 200 | Low-density polyethylene | 3.0 |
| 6 | Coated | 500 | Coated | 50 | Coated | 200 | Low-density polyethylene | 3.0 |
| 7 | Coated | 500 | Coated | 50 | Coated | 200 | Low-density polyethylene | 3.0 |
| 8 | Coated | 500 | Coated | 50 | Coated | 200 | High-density polyethylene | 3.0 |
| 9 | Coated | 500 | Coated | 50 | Coated | 200 | Straight-chain low-density polyethylene | 3.0 |
| 10 | Coated | 500 | Coated | 50 | Coated | 200 | Polypropylene | 3.0 |

TABLE 3

| Ex. of Invention | Results of abrasion test Depth of abrasion (mm) | Results of impact test Pinhole or crack | Results of impact test Peeling | Flaw resistance test Damage to covering |
| --- | --- | --- | --- | --- |
| 1 | <0.01 | None occurred | None occurred | None occurred |
| 2 | <0.01 | None occurred | None occurred | None occurred |
| 3 | <0.01 | None occurred | None occurred | None occurred |
| 4 | <0.01 | None occurred | None occurred | None occurred |
| 5 | <0.01 | None occurred | None occurred | None occurred |
| 6 | <0.01 | None occurred | None occurred | None occurred |
| 7 | <0.01 | None occurred | None occurred | None occurred |
| 8 | <0.01 | None occurred | None occurred | None occurred |
| 9 | <0.01 | None occurred | None occurred | None occurred |
| 10 | <0.01 | None occurred | None occurred | None occurred |

It is noted that the left side of Table 2 is placed next to the right side of Table 1, and the left side of Table 3 is placed next to the right side of Table 2 to constitute one table.

actually exposing a sample at a coastline for two years and then measuring the abrasion loss of the covering material. The impact resistance test was carried out by dropping a bell having a size of ⅝ in. and a weight of 10 kg from a height of 1 m onto a sample to examine whether or not cracking and/or peeling of the covering occurred. The flaw resistance test was carried out by raising a sample to a height of 10 m and lowering the sample using a wire sling 500 times to examine whether or not damage to the covering occurred. The results of the above tests are given in the above Tables 1 to 3 and the following Tables 4 to 12. The left side of Table 5 is placed on the right side of Table 4, and the left side of Table 6 is placed on the right side of Table 5 to constitute one table. The left side of Table 8 is placed on the right side of Table 7, and the left side of Table 9 is placed on the right side of Table 8 to constitute one table. Further, the left side of Table 11 is placed on the right side of Table 10, and the left side of Table 12 is placed on the right side of Table 11 to constitute one table.

TABLE 4

| | Covering material | | | | | | | |
| --- | --- | --- | --- | --- | --- | --- | --- | --- |
| Ex. of Invention | Chromate treatment | Layer thickness (mg/m²) | Epoxy primer | Layer thickness (μm) | Modified polyolefin resin | Layer thickness (μm) | Polyolefin resin | Layer thickness (mm) |
| 11 | Coated | 500 | Coated | 50 | Coated | 200 | Low-density polyethylene colored by addition of organic pigment | 3.0 |
| 12 | Coated | 500 | Coated | 50 | Coated | 200 | Low-density polyethylene colored by addition of inorganic pigment | 3.0 |
| 13 | Coated | 500 | Coated | 50 | Coated | 200 | Low-density polyethylene colored by addition of organic pigment*** | 3.0 |
| 14 | Coated | 500 | Coated | 50 | Coated | 200 | Low-density polyethylene colored by addition of inorganic pigment*** | 3.0 |
| 15 | Coated | 500 | Coated | 50 | Coated | 200 | Low-density polyethylene | 3.0 |

Note) ***: A weatherproof agent was added to the colored polyethylene resin.

For Examples 11 to 19, steel pipes covered with a high-strength color polyethylene were produced in the same manner as described above, except that the steel pipe was covered with a color polyethylene, a modified color polyethylene, or a colored fiber cloth. For Examples 20 to 29, steel pipes covered with a high-strength polyethylene were produced in the same manner as described above, except that the covering thickness was varied. For Example 30, a steel pipe covered with a high-strength polyethylene was produced in the same manner as described above, except that the fiber cloth, to which a modified polyolefin resin was to be laminated, had been previously surface-treated with a silane coupling agent. The resultant polyolefin-covered steel pipes were tested for impact resistance, flaw resistance, and resistance to abrasion with littoral drift. The littoral drift abrasion test was carried out by

TABLE 5

| | Covering material | | | |
| --- | --- | --- | --- | --- |
| Ex. of Invention | Fiber cloth | Modified polyolefin resin | Layer thickness (mm) | Surface treatment of fiber cloth |
| 11 | Glass cloth | Maleic anhydride-modified PE* | 2.0 | Not done |
| 12 | Glass cloth | Maleic anhydride-modified PE* | 2.0 | Not done |
| 13 | Glass cloth | Maleic anhydride-modified PE* | 2.0 | Not done |
| 14 | Glass cloth | Maleic anhydride-modified PE* | 2.0 | Not done |

TABLE 5-continued

| Ex. of Invention | Fiber cloth | Covering material Modified polyolefin resin | Layer thickness (mm) | Surface treatment of fiber cloth |
|---|---|---|---|---|
| 15 | Glass cloth | Maleic anhydride-modified PE colored with organic pigment* | 2.0 | Not done |

Note) Maleic anhydride-modified PE marked with * is the abbreviation for a polyethylene modified with maleic anhydride.

TABLE 6

| Ex. of Invention | Results of abrasion test Depth of abrasion (mm) | Results of impact test Pinhole or crack | Peeling | Flaw resistance test Damage to covering |
|---|---|---|---|---|
| 11 | <0.01 | None occurred | None occurred | None occurred |
| 12 | <0.01 | None occurred | None occurred | None occurred |
| 13 | <0.01 | None occurred | None occurred | None occurred |
| 14 | <0.01 | None occurred | None occurred | None occurred |
| 15 | <0.01 | None occurred | None occurred | None occurred |

TABLE 8

| Ex. of Invention | Fiber cloth | Covering material Modified polyolefin resin | Layer thickness (mm) | Surface treatment of fiber cloth |
|---|---|---|---|---|
| 16 | Glass cloth | Maleic anhydride-modified PE colored with inorganic pigment* | 2.0 | Not done |
| 17 | Glass cloth | Maleic anhydride-modified PE colored with organic pigment* | 2.0 | Not done |
| 18 | Glass cloth | Maleic anhydride-modified PE colored with inorganic pigment* | 2.0 | Not done |
| 19 | Colored glass cloth | Maleic anhydride-modified PE* | 2.0 | Not done |
| 20 | Glass cloth | Maleic anhydride-modified PE* | 2.0 | Not done |
| 21 | Glass cloth | Maleic anhydride-modified PE* | 2.0 | Not done |
| 22 | Glass cloth | Maleic anhydride-modified PE* | 2.0 | Not done |
| 23 | Glass cloth | Maleic anhydride-modified PE* | 2.0 | Not done |

Note) Maleic anhydride-modified PE marked with * is the abbreviation for a polyethylene modified with maleic anhydride.

TABLE 7

| Ex. of Invention | Chromate treatment | Layer thickness (mg/m$^2$) | Epoxy primer | Layer thickness (μm) | Modified polyolefin resin | Layer thickness (μm) | Polyolefin resin | Layer thickness (mm) |
|---|---|---|---|---|---|---|---|---|
| 16 | Coated | 500 | Coated | 50 | Coated | 200 | Low-density polyethylene | 3.0 |
| 17 | Coated | 500 | Coated | 50 | Coated | 200 | Low-density polyethylene colored by addition of organic pigment*** | 3.0 |
| 18 | Coated | 500 | Coated | 50 | Coated | 200 | Low-density polyethylene colored by addition of inorganic pigment*** | 3.0 |
| 19 | Coated | 500 | Coated | 50 | Coated | 10 | Low-density polyethylene | 3.0 |
| 20 | Coated | 10 | Coated | 50 | Coated | 200 | Low-density polyethylene | 3.0 |
| 21 | Coated | 1500 | Coated | 50 | Coated | 200 | Low-density polyethylene | 3.0 |
| 22 | Coated | 500 | Coated | 5 | Coated | 200 | Low-density polyethylene | 3.0 |
| 23 | Coated | 500 | Coated | 300 | Coated | 200 | Low-density polyethylene | 3.0 |

Note) ***: A weatherproof agent was added to the colored polyethylene resin.

TABLE 9

| Ex. of Invention | Results of abrasion test Depth of abrasion (mm) | Results of impact test Pinhole or crack | Peeling | Flaw resistance test Damage to covering |
|---|---|---|---|---|
| 16 | <0.01 | None occurred | None occurred | None occurred |
| 17 | <0.01 | None occurred | None occurred | None occurred |
| 18 | <0.01 | None occurred | None occurred | None occurred |
| 19 | <0.01 | None occurred | None occurred | None occurred |
| 20 | <0.01 | None occurred | None occurred | None occurred |
| 21 | <0.01 | None occurred | None occurred | None occurred |
| 22 | <0.01 | None occurred | None occurred | None occurred |
| 23 | <0.01 | None occurred | None occurred | None occurred |

TABLE 10

| Ex. of Invention | Chromate treatment | Layer thickness (mg/m$^2$) | Epoxy primer | Layer thickness (μm) | Modified polyolefin resin | Layer thickness (μm) | Polyolefin resin | Layer thickness (mm) |
|---|---|---|---|---|---|---|---|---|
| 24 | Coated | 500 | Coated | 50 | Coated | 10 | Low-density polyethylene | 3.0 |
| 25 | Coated | 500 | Coated | 50 | Coated | 3000 | Low-density polyethylene | 3.0 |
| 26 | Coated | 500 | Coated | 50 | Coated | 200 | Low-density polyethylene | 0.5 |
| 27 | Coated | 500 | Coated | 50 | Coated | 200 | Low-density polyethylene | 10.0 |
| 28 | Coated | 500 | Coated | 50 | Coated | 200 | Low-density polyethylene | 3.0 |
| 29 | Coated | 500 | Coated | 50 | Coated | 200 | Low-density polyethylene | 3.0 |
| 30 | Coated | 500 | Coated | 50 | Coated | 200 | Low-density polyethylene | 3.0 |

TABLE 11

| Ex. of Invention | Fiber cloth | Modified polyolefin resin | Layer thickness (mm) | Surface treatment of fiber cloth |
|---|---|---|---|---|
| 24 | Glass cloth | Maleic anhydride-modified PE* | 2.0 | Not done |
| 25 | Glass cloth | Maleic anhydride-modified PE* | 2.0 | Not done |
| 26 | Glass cloth | Maleic anhydride-modified PE* | 2.0 | Not done |
| 27 | Glass cloth | Maleic anhydride-modified PE* | 2.0 | Not done |
| 28 | Glass cloth | Maleic anhydride-modified PE* | 0.5 | Not done |
| 29 | Glass cloth | Maleic anhydride-modified PE* | 10.0 | Not done |
| 30 | Glass cloth | Maleic anhydride-modified PE* | 2.0 | Done |

Note) Maleic anhydride-modified PE marked with * is the abbreviation for a polyethylene modified with maleic anhydride.

TABLE 12

| Ex. of Invention | Results of abrasion test Depth of abrasion (mm) | Results of impact test Pinhole or crack | Peeling | Flaw resistance test Damage to covering |
|---|---|---|---|---|
| 24 | <0.01 | None occurred | None occurred | None occurred |
| 25 | <0.01 | None occurred | None occurred | None occurred |
| 26 | <0.01 | None occurred | None occurred | None occurred |
| 27 | <0.01 | None occurred | None occurred | None occurred |
| 28 | <0.01 | None occurred | None occurred | None occurred |
| 29 | <0.01 | None occurred | None occurred | None occurred |
| 30 | <0.01 | None occurred | None occurred | None occurred |

The above procedure was repeated to produce a polyethylene-covered steel pipe wherein the polyethylene covering is not covered with a fiber cloth with a modified polyolefin resin being laminated thereto (Comparative Example 1), a steel pipe wherein the uppermost layer was covered with a glass fiber reinforced polyethylene resin comprising short fibers dispersed in a 3), and polyethylene-covered steel pipes of the same types as described above, except that the thickness of the covering material was varied (Comparative Examples 4 to 12). The covered steel pipes thus obtained were tested for resistance to abrasion by littoral drift, for impact resistance, and for flaw resistance. The results are also given in Tables 13 to 18. The left side of Table 14 is placed on the right side of Table 13, and the left side of Table 15 is placed on the right side of Table 14 to constitute one table. Further, the left side of Table 17 was placed on the right side of Table 16, and the left side of Table 18 is placed on the right side of Table 17 to constitute one table.

TABLE 13

| Comp. Ex. | Chromate treatment | Layer thickness (mg/m²) | Epoxy primer | Layer thickness (μm) | Modified polyolefin resin | Layer thickness (μm) | Polyolefin resin | Layer thickness (mm) |
|---|---|---|---|---|---|---|---|---|
| 1 | Coated | 500 | Coated | 50 | Coated | 200 | Low-density polyethylene | 3.0 |
| 2 | Coated | 500 | Coated | 50 | Coated | 200 | Glass fiber reinforced polyetylene with short fibers dispersed in polyethylene resin | 3.0 |
| 3 | Coated | 5 | Coated | 50 | Coated | 200 | Low-density polyethylene | 3.0 |
| 4 | Coated | 1600 | Coated | 50 | Coated | 200 | Low-density polyethylene | 3.0 |
| 5 | Coated | 500 | Coated | 4 | Coated | 200 | Low-density polyethylene | 3.0 |
| 6 | Coated | 500 | Coated | 350 | Coated | 200 | Low-density polyethylene | 3.0 |
| 7 | Coated | 500 | Coated | 50 | Coated | 5 | High-density polyethylene | 3.0 |
| 8 | Coated | 500 | Coated | 50 | Coated | 3500 | Low-density polyethylene | 3.0 |

TABLE 14

| Comp. Ex. | Fiber cloth | Modified polyolefin resin | Layer thickness (mm) | Surface treatment of fiber cloth |
|---|---|---|---|---|
| 1 | None | Maleic anhydride-modified PE* | 2.0 | Not done |
| 2 | Glass cloth | Maleic anhydride-modified PE* | 2.0 | Not done |
| 3 | Glass cloth | Maleic anhydride-modified PE* | 2.0 | Not done |
| 4 | Glass cloth | Maleic anhydride-modified PE* | 2.0 | Not done |
| 5 | Glass cloth | Maleic anhydride-modified PE* | 2.0 | Not done |
| 6 | Glass cloth | Maleic anhydride-modified PE* | 2.0 | Not done |
| 7 | Glass cloth | Maleic anhydride-modified PE* | 2.0 | Not done |
| 8 | Glass cloth | Maleic anhydride-modified PE* | 2.0 | Not done |

Note) Maleic anhydride-modified PE marked with * is the abbreviation for a polyethylene modified with maleic anhydride.

TABLE 15

| Comp. Ex. | Results of abrasion test Depth of abrasion (mm) | Results of impact test Pinhole or crack | Peeling | Flaw resistance test Damage to covering |
|---|---|---|---|---|
| 1 | 0.05 | Occurred | None occurred | Occurred |
| 2 | 2.00 | None occurred | Occurred | None occurred |
| 3 | <0.01 | Occurred | Occurred | None occurred |
| 4 | <0.01 | None occurred | Occurred | None occurred |
| 5 | <0.01 | Occurred | Occurred | None occurred |
| 6 | <0.01 | Occurred | Occurred | None occurred |
| 7 | <0.01 | Occurred | Occurred | None occurred |
| 8 | <0.01 | None occurred | None occurred | None occurred |

TABLE 16

| Comp. Ex. | Chromate treatment | Layer thickness (mg/m²) | Epoxy primer | Layer thickness (μm) | Modified polyolefin resin | Layer thickness (μm) | Polyolefin resin | Layer thickness (mm) |
|---|---|---|---|---|---|---|---|---|
| 9 | Coated | 500 | Coated | 50 | Coated | 200 | Low-density polyethylene | 0.4 |
| 10 | Coated | 500 | Coated | 50 | Coated | 200 | Low-density polyethylene | 10.5 |

TABLE 16-continued

| | | Covering material | | | | | |
|---|---|---|---|---|---|---|---|
| Comp. Ex. | Chromate treatment | Layer thickness (mg/m$^2$) | Epoxy primer | Layer thickness (μm) | Modified polyolefin resin | Layer thickness (μm) | Polyolefin resin | Layer thickness (mm) |
| 11 | Coated | 500 | Coated | 50 | Coated | 200 | Low-density polyethylene | 3.0 |
| 12 | Coated | 500 | Coated | 50 | Coated | 200 | Low-density polyethylene | 3.0 |

TABLE 17

| | | Covering material | | |
|---|---|---|---|---|
| Comp. Ex. | Fiber cloth | Modified polyolefin resin | Layer thickness (mm) | Surface treatment of fiber cloth |
| 9 | Glass cloth | Maleic anhydride-modified PE* | 2.0 | Not done |
| 10 | Glass cloth | Maleic anhydride-modified PE* | 2.0 | Not done |
| 11 | Glass cloth | Maleic anhydride-modified PE* | 0.004 | Not done |
| 12 | Glass cloth | Maleic anhydride-modified PE* | 10.5 | Not done |

Note) Maleic anhydride-modified PE marked with * is the abbreviation for a polyethylene modified with maleic anhydride.

TABLE 18

| Comp. Ex. | Results of abrasion test Depth of abrasion (mm) | Results of impact test Pinhole or crack | Peeling | Flaw resistance test Damage to covering |
|---|---|---|---|---|
| 9 | <0.01 | Occurred | Occurred | None occurred |
| 10 | <0.01 | None occurred | None occurred | None occurred |
| 11 | 0.5 | None occurred | None occurred | Occurred |
| 12 | <0.01 | None occurred | None occurred | None occurred |

As is apparent from Tables 1 to 18, in a polyolefin-covered steel pipe comprising a steel product which has been subjected to surface treatment, and having laminated onto the treated surface, a modified polyolefin resin layer 2 and a polyolefin resin layer 3, when the surface of the polyolefin resin layer 3 is covered with a fiber cloth 4 to which a modified polyolefin resin has been laminated, the resultant high-strength covered steel pipe exhibits very good results, unattainable in the prior art, in an impact test and a flaw resistance test, as well as in a test on resistance to abrasion by littoral drift.

INDUSTRIAL APPLICABILITY

As is apparent from the above examples, the polyolefin-covered steel product according to the present invention is much superior to conventional polyolefin-covered steel products in impact resistance and flaw resistance, as well as in resistance to abrasion by littoral drift, by virtue of the provision of a fiber cloth 4, to which a modified polyolefin resin has been laminated, on a polyolefin covering layer 3 as an anticorrosive layer, so that the present invention has a marked advantage over the polyolefin-covered steel products of the prior art.

We claim:

1. A polyolefin-covered steel product having excellent impact resistance, flaw resistance, and abrasion resistance, for use in a steel structure, comprising a steel product which has been subjected to surface treatment as a pretreatment, and having laminated onto the treated surface, a modified polyolefin resin layer and a polyolefin resin layer, characterized in that the surface of the laminate of said modified polyolefin resin layer and said polyolefin resin layer is covered with a fiber cloth to which a modified polyolefin resin has been laminated.

2. A polyolefin-covered steel product having excellent impact resistance, flaw resistance, and abrasion resistance, for use in a steel structure, comprising a steel product which has been subjected to surface treatment as a pretreatment, and having laminated onto the treated surface, a modified polyolefin resin layer and a polyolefin resin layer, characterized in that the surface of the laminate of said modified polyolefin resin layer and said polyolefin resin layer is covered with a fiber cloth to which a modified polyolefin resin containing a color pigment comprising an organic pigment or an inorganic pigment and various antioxidants has been laminated.

3. A polyolefin-covered steel product having excellent impact resistance, flaw resistance, and abrasion resistance, for use in a steel structure, comprising a steel product which has been subjected to surface treatment as a pretreatment, and having laminated onto the treated surface, a modified polyolefin resin layer and a polyolefin resin layer, characterized in that the surface of the laminate of said modified polyolefin resin layer and said polyolefin resin layer is covered with a colored fiber cloth to which a modified polyolefin resin has been laminated.

4. The polyolefin-covered steel product having excellent impact resistance, flaw resistance, and abrasion resistance according to claim 1 wherein said surface treatment comprises a chromate treatment to produce a chromate coating at a total Cr coverage of 10 to 1500 mg/m$^2$.

5. The polyolefin-covered steel product having excellent impact resistance, flaw resistance, and abrasion resistance according to claim 1, wherein said surface treatment comprises a chromate treatment to produce a chromate coating at a total Cr coverage of 10 to 1500 mg/m$^2$ and an epoxy primer treatment to produce a primer coating having a thickness of 5 to 300 μm.

6. The polyolefin-covered steel product having excellent impact resistance, flaw resistance, and abrasion resistance according to claim 1, wherein said modified polyolefin resin covering has a thickness in the range of from 10 μm to 3 mm, said polyolefin resin covering has a thickness in the range of from 1 to 10 mm, and said modified polyolefin resin covering laminated onto said fiber cloth has a thickness in the range of from 5 μm to 10 mm.

7. The polyolefin-covered steel product having excellent impact resistance, flaw resistance, and abrasion resistance according to claim 2, wherein said surface treatment comprises a chromate treatment to produce a chromate coating at a total Cr coverage of 10 to 1500 mg/m$^2$.

8. The polyolefin-covered steel product having excellent impact resistance, flaw resistance, and abrasion resistance according to claim 2, wherein said surface treatment comprises a chromate treatment to produce a chromate coating at a total Cr coverage of 10 to 1500 mg/m$^2$ and an epoxy primer treatment to produce a primer coating having a thickness of 5 to 300 μm.

9. The polyolefin-covered steel product having excellent impact resistance, flaw resistance, and abrasion resistance according to claim 2, wherein said modified, polyolefin resin covering has a thickness in the range of from 10 μm to 3 mm, said polyolefin resin covering has a thickness in the range of from 1 to 10 mm, and said modified polyolefin resin covering laminated onto said fiber cloth has a thickness in the range of from 5 μm to 10 mm.

10. The polyolefin-covered steel product having excellent impact resistance, flaw resistance, and abrasion resistance according to claim 3, wherein said surface treatment comprises a chromate treatment to produce a chromate coating at a total Cr coverage of 10 to 1500 mg/m$^2$.

11. The polyolefin-covered steel product having excellent impact resistance, flaw resistance, and abrasion resistance according to claim 3, wherein said surface treatment comprises a chromate treatment to produce a chromate coating at a total Cr coverage of 10 to 1500 mg/m$^2$ and the epoxy primer treatment to produce a primer coating having a thickness of 5 to 300 μm.

12. The polyolefin-covered steel product having excellent impact resistance, flaw resistance, and abrasion resistance according to claim 3, wherein said modified polyolefin resin covering has a thickness in the range of from 10 μm to 3 mm, turn, said polyolefin resin covering has a thickness in the range of from 1 to 10 mm, and said modified polyolefin resin covering laminated onto said fiber cloth has a thickness in the range of from 5 μm to 10 mm.

* * * * *

UNITED STATES PATENT AND TRADEMARK OFFICE
CERTIFICATE OF CORRECTION

PATENT NO. : 5,654,104
DATED : August 5, 1997
INVENTOR(S) : Nobuki YOSHIZAKI, et al.

It is certified that error appears in the above-indentified patent and that said Letters Patent is hereby corrected as shown below:

Column 14, line 54, after "dispersed in a" insert --polyethylene resin (Comparative Example 2), a steel pipe covered with a fiber cloth to which no modified polyolefin resin had been laminated (Comparative Example 3),...--.

Column 20, line 15, delete "turn,".

Signed and Sealed this

Fourteenth Day of April, 1998

Attest:

BRUCE LEHMAN

*Attesting Officer*  *Commissioner of Patents and Trademarks*